United States Patent
Bolz et al.

(10) Patent No.: US 6,867,559 B2
(45) Date of Patent: Mar. 15, 2005

(54) WIPER ARRANGEMENT FOR MOTOR VEHICLES, ESPECIALLY FOR CAR WINDSCREENS

(75) Inventors: Martin-Peter Bolz, Buehl (DE); Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/415,539

(22) PCT Filed: Jun. 8, 2002

(86) PCT No.: PCT/DE02/02098

§ 371 (c)(1),
(2), (4) Date: Apr. 30, 2003

(87) PCT Pub. No.: WO03/026935

PCT Pub. Date: Apr. 3, 2003

(65) Prior Publication Data

US 2004/0032229 A1 Feb. 19, 2004

(30) Foreign Application Priority Data

Sep. 13, 2001 (DE) ........................ 101 45 103

(51) Int. Cl.⁷ .............................................. H02P 5/46
(52) U.S. Cl. .................. 318/68; 318/443; 318/DIG. 2; 318/444
(58) Field of Search ........................... 318/68, 443, 41, 318/62, DIG. 2, 34, 37, 444; 15/250.12; 600/167; 382/276; 369/44.14

(56) References Cited

U.S. PATENT DOCUMENTS

| | | | |
|---|---|---|---|
| 4,556,964 A | * 12/1985 | Trethewey | ............ 369/44.14 |
| 4,585,980 A | 4/1986 | Gille et al. | |
| 4,723,101 A | 2/1988 | Bauer et al. | |
| 5,105,284 A | * 4/1992 | Sakata et al. | ............ 358/404 |
| 5,256,950 A | 10/1993 | Matsumoto et al. | |
| 5,331,257 A | 7/1994 | Materne et al. | |
| 5,548,666 A | * 8/1996 | Yoneda et al. | ............ 382/276 |
| 5,582,576 A | * 12/1996 | Hori et al. | ............ 600/167 |
| 6,107,766 A | 8/2000 | Amagasa | |
| 6,743,861 B1 | * 6/2004 | Matsumoto et al. | ......... 713/193 |

FOREIGN PATENT DOCUMENTS

| | | |
|---|---|---|
| EP | 0 952 056 A2 | 10/1999 |
| GB | 1 522 822 | 8/1978 |
| WO | 02 07696 A | 10/2002 |

* cited by examiner

*Primary Examiner*—Karen Masih
(74) *Attorney, Agent, or Firm*—Michael J. Striker

(57) ABSTRACT

In a wiper system for vehicles, in particular for automobile windshields, including a first wiper arm, a primary drive motor (12) associated with the wiper arm for generating a defined wiping motion of the first wiper arm, at least one second wiper arm, and a secondary drive motor (13) associated with the second wiper arm for generating a defined wiping motion of the second wiper arm, the secondary drive motor (13) being controlled as a function of the position of the primary drive motor (12), a motor position code element (23) is provided, which is coupled to the primary drive motor (12) and is provided with control codes (24) that are directly representative of the associated position of the secondary drive motor (13). For scanning the control codes (24) of the motor position code element (23), a scanner unit (25) is used, which via a signal connection (22) is connected to a controller (27) of the secondary drive motor (13).

10 Claims, 1 Drawing Sheet

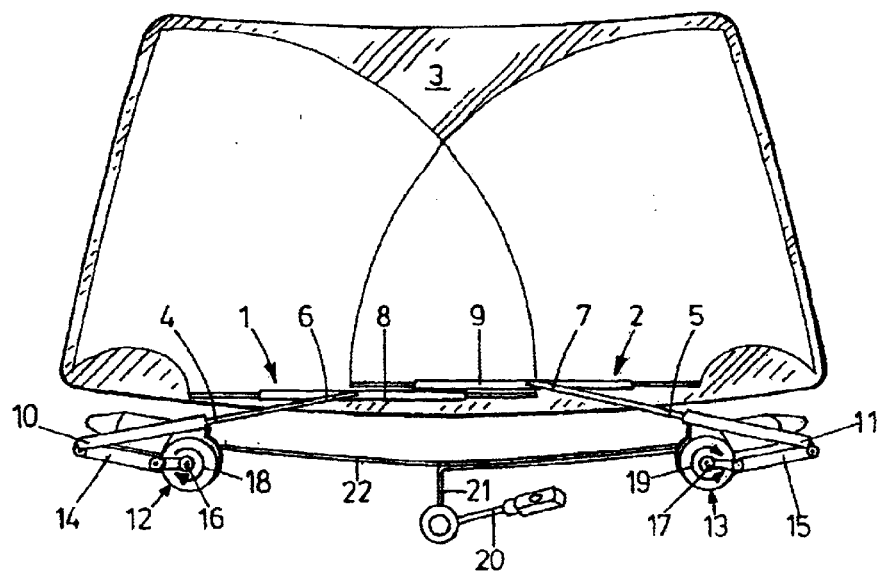
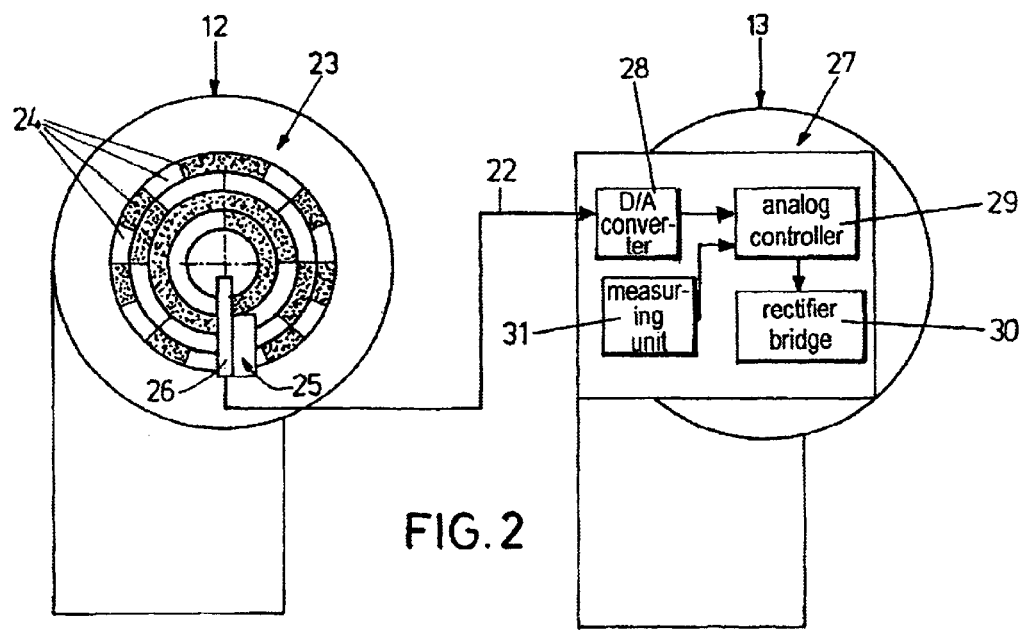

WIPER ARRANGEMENT FOR MOTOR VEHICLES, ESPECIALLY FOR CAR WINDSCREENS

The invention relates to a wiper system for vehicles, in particular for automobile windshields.

In such dual-drive-motor wiper systems, each wiper arm is driven by its own drive motor. For performing the desired wiping operation on the windshield, the wiper arms must sweep over the field to be wiped with a precisely defined speed profile. This profile can be achieved, for instance via an electronically controlled drive motor, by means of specifying desired variables. Alternatively, this speed profile can also be attained by a nonreversing, that is, a revolving cylinder drive motor, with a suitable wiper arm connection, for instance via a rod linkage. In order to attain a precisely defined relationship at all times between the wiping motions or wiper arm positions of the two wiper arms, regardless of external loads that actually act upon the wiper arms, coupling of the two drive motors is necessary. To that end, the wiper arm moved by a primary drive motor proceeds through its wiper path in accordance with a planned desired wiping path course. The actual position of the primary drive motor is sensed and transmitted to a secondary drive motor, which drives the second wiper arm. The information about the position of the primary drive motor is processed in a microcontroller and taken into account in calculating the desired position of the secondary drive motor. The secondary drive motor is thus controlled as a function of the position of the primary drive motor.

A disadvantage of this known wiper system is the requisite precise calculation of the position of the secondary drive motor as a function of the position of the primary drive motor. This calculation requires a microcontroller, which stands in the way of an especially economical embodiment of a wiper system.

With this as the point of departure, it is the object of the invention to design a wiper system of the generic type in question such that the position of the secondary drive motor is controlled especially functionally reliably as a function of the primary drive motor, without requiring an expensive drive motor controller.

SUMMARY OF INVENTION

The nucleus of the invention is considered to be that a motor position code element is provided which is coupled with the primary drive motor and has control codes that are directly representative of the associated position of the secondary drive motor. As a result of this design, an especially economical wiper system is achieved, since calculation of the position of the secondary drive motor as a function of the primary drive motor to achieve a precisely defined relationship between the two respective wiper arm positions is not done. Instead, the secondary drive motor is supplied directly with control commands, which because of the physical coupling between the code element and the primary drive motor have the requisite exact association with the position of the primary motor. An alternative storage of the applicable position of the secondary drive motor in memory as a function of the primary drive motor is also dispensed with. Consequently, in this wiper system of the invention a microcontroller is not necessary.

Other advantageous features are defined by the dependent claims.

The invention is described in further detail below in terms of a preferred exemplary embodiment in conjunction with the drawings. Shown are:

FIG. 1, a schematic front view of a dual-drive-motor wiper system; and

FIG. 2, a schematic view of a coupling according to the invention of the two drive motors in this wiper system.

A dual-drive-motor wiper system shown in FIG. 1 includes two wiper arms 1, 2, which are intended for wiping an automobile windshield 3. Each wiper arm 1, 2 has a wiper rod 4, 5, which on its respective free end 6, 7 carries a wiper blade 8, 9 and which is pivotably connected by its other end 10, 11 to a fastening arm 14, 15 that is connected to a drive motor 12, 13. The wiper rod 5 can optionally also be mounted directly on the driven shaft of the drive motor unit 13. The fastening arms 14, 15 are pivotably connected to a driven shaft 16, 17 of the drive motors 12, 13. The drive motor 12 shown on the left in FIG. 1 is the primary drive motor of the wiper system and is embodied as a revolving cylinder motor, as also indicated by arrow 18. The drive motor 13 shown in the right half of FIG. 1 will hereinafter be called the secondary drive motor and is driven in reversing fashion, as indicated by the arrow 19.

For actuating the drive motors 12, 13 and thus also the wiper arms 1, 2, an actuating lever 20 in the interior of the vehicle is provided, which is associated with the secondary drive motor 13 via a connecting line 21. The two drive motors 12, 13 communicate with one another via a signal connection 22.

As seen in FIG. 2, an optical motor position code disk 23 is coupled with the primary drive motor 12 shown schematically in the left half of FIG. 2. This code disk is mounted on the driven shaft 16 of the primary drive motor 12 and includes binary control codes 24, in the form of partial-circle strips disposed on concentric annular paths, and these codes are directly representative of the associated position of the secondary drive motor 13. This means that for each position of the primary drive motor 12, a corresponding desired position of the secondary drive motor 13 is stored in memory; that is, the motor position code disk 23 contains control codes for the desired wiping motion of the wiper arm 2 associated with the secondary drive motor 13.

For scanning the control codes 24 contained on the motor position code disk 23, a conventional optical scanner unit 25 with scanning diodes 26 is provided. By means of the motor position code disk 23 and the scanner unit 25, a digital desired value signal for the position of the secondary drive motor 13 is generated. This digital desired value signal is transmitted over the signal connection 22 to a controller 27 associated with the secondary drive motor 13. The controller 27, at its input, includes a digital/analog converter 28. Downstream of the digital/analog converter 28 is an analog controller 29, whose output is connected to the input of a rectifier bridge 30. Angle signals of the position of the secondary drive motor 13 are also transmitted to the analog controller 29. These angle signals are sensed by a measuring unit 31 associated with the driven shaft 17 of the secondary drive motor 13. The digital/analog converter 28 and the analog controller 29 serve to process the digital desired value signal and to provide voltage-controlled regulation of the position of the secondary drive motor 13 as a function of the position of the primary drive motor 12. Optionally, the corresponding control voltage for the secondary drive motor can have a voltage pilot control superimposed on it, whose value is generated from a corresponding code in the code disk 23. Regulating the secondary drive motor 13 neither requires a memory component in which the desired position of the secondary drive motor 13 is stored, nor calculation of the position of the secondary drive motor 13 separately from data pertaining to the position of the primary motor.

The relationship of the two drive motors 12, 13 to one another is the well-known relationship of master to slave.

Alternatively to the embodiment described with the optical motor position code disk 23, an embodiment with a magnetic motor position code disk is also conceivable. In an especially inexpensive embodiment of the controller 27, only analog components are provided.

What is claimed is:

1. A wiper system for vehicles, comprising:
    a first wiper arm (1),
    a primary drive motor (12) associated with the wiper arm, for generating a defined wiping motion of the first wiper arm (1),
    at least one second wiper arm (2), and
    a secondary drive motor (13), associated with the second wiper arm, for generating a defined wiping motion of the second wiper arm (2), the secondary drive motor (13) being controlled as a function of the position of the primary drive motor (12),
    characterized by
    a motor position code element (23), which is coupled to the primary drive motor (12) and is provided with control codes (24) that are directly representative of the associated position of the secondary drive motor (13);
    a scanner unit (25) for the control codes (20) of the motor position code element (23); and
    a signal connection (22) between the scanner unit (25) and a controller (27) of the secondary drive motor (13).

2. The wiper system of claim 1, wherein the primary drive motor (12) is embodied as a revolving cylinder engine.

3. The wiper system of claim 1, wherein the secondary drive motor (13) is embodied as a reversing motor.

4. The wiper system of one of claim 1, wherein the secondary drive motor (13) is provided with a voltage pilot control, wherein a value of the voltage pilot control can be generated by an additional code in the code element (23).

5. The wiper system of one of claim 1, wherein the motor position code element (23) is embodied as a code disk.

6. The wiper system of claim 5, wherein the code disk (23) is embodied as an optical code disk.

7. The wiper system of claim 6, wherein the scanner unit (25) includes scanning diodes (26).

8. The wiper system of claim 5, wherein the code disk (23) is embodied as a magnetic code disk.

9. The wiper system of one of claim 1, wherein by means of the code element (23) and the scanner unit (25), a digital desired value signal for the secondary drive motor (13) can be generated, which for processing and regulating the digital desired value signal and for its regulation has a digital/analog converter (28) and an analog controller (29).

10. A wiper system for vehicles, comprising:
    a first wiper arm (1),
    a primary drive motor (12) associated with, the wiper arm, for generating a defined wiping motion of the first wiper arm (1),
    at least one second wiper arm (2), and
    a secondary drive motor (13), associated with the second wiper arm, for generating a defined wiping motion of the second wiper arm (2), the secondary drive motor (13) being controlled as a function of the position of the primary drive motor (12),
    characterized by
    a motor position code element (23), which is coupled to the primary drive motor (12) and is provided with control codes (24) that are directly representative of the associated position of the secondary drive motor (13), so that for each position of the primary drive motor (12), a corresponding desired position of the secondary drive motor (13) is contained on the motor position code element (23):
    a scanner unit (25) for the control codes (20) of the motor position code element (23); and
    a signal connection (22) between the scanner unit (25) and a controller (27) of the secondary drive motor (13).

* * * * *